(12) United States Patent
Kim et al.

(10) Patent No.: US 12,075,283 B2
(45) Date of Patent: Aug. 27, 2024

(54) METHOD AND APPARATUS FOR PROVIDING TRAFFIC STEERING IN MOBILE COMMUNICATION SYSTEM

(71) Applicant: SAMSUNG ELECTRONICS CO., LTD., Suwon-si (KR)

(72) Inventors: Dongyeon Kim, Suwon-si (KR); Jinkyu Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 17/657,917

(22) Filed: Apr. 4, 2022

(65) Prior Publication Data
US 2022/0322143 A1     Oct. 6, 2022

(30) Foreign Application Priority Data
Apr. 5, 2021   (KR) .................. 10-2021-0044105

(51) Int. Cl.
*H04W 28/00*       (2009.01)
*H04L 47/34*       (2022.01)
(Continued)

(52) U.S. Cl.
CPC ......... *H04W 28/0867* (2020.05); *H04L 47/34* (2013.01); *H04W 28/082* (2023.05);
(Continued)

(58) Field of Classification Search
CPC ... H04W 84/042; H04W 92/24; H04W 48/18; H04W 36/18; H04W 76/15; H04W 24/04;
(Continued)

(56) References Cited

U.S. PATENT DOCUMENTS

2019/0357082 A1   11/2019   Kim et al.
2022/0086698 A1*  3/2022   Yao .................... H04L 43/08
(Continued)

OTHER PUBLICATIONS

3GPP TS 23.503 V17.0.0; (Mar. 2021) Technical Specification; 3rd Generation Partnership Project; Technical Specification Group Services and System Aspects; Policy and charging control framework for the 5G System (5GS); Stage 2 (Release 17); 128 pages.
(Continued)

*Primary Examiner* — Gerald A Smarth (57) ABSTRACT

The present disclosure relates to a communication technique for converging a 5G communication system for supporting a higher data rate after a 4G system with IoT technology. The present disclosure can be applied to intelligent services based on 5G communication technology and IoT-related technology. According to an embodiment, a method for providing a MA PDU service to a UE by a UPF device in a mobile communication system may include receiving an N4 rule including a traffic transmission method for downlinks (DLs) to the UE from an SMF device, wherein the DLs include a DL of 3GPP access and a DL of non-3GPP access; receiving a split ratio change report for UL traffic to the 3GPP access and UL traffic to the non-3GPP access from the UE; generating a traffic counter based on the received split ratio change report; and transmitting the split ratio change report to the SMF device.

16 Claims, 5 Drawing Sheets

(51) Int. Cl.
*H04W 28/08* (2023.01)
*H04W 28/082* (2023.01)
*H04W 28/086* (2023.01)
*H04W 28/10* (2009.01)
*H04W 72/23* (2023.01)

(52) U.S. Cl.
CPC ....... *H04W 28/0865* (2023.05); *H04W 28/10* (2013.01); *H04W 72/23* (2023.01)

(58) Field of Classification Search
CPC ............ H04W 24/08; H04W 28/0268; H04W 28/086; H04W 36/12; H04W 36/14; H04W 76/20; H04W 80/10; H04W 28/02; H04W 76/16; H04W 28/12; H04W 28/10; H04W 24/10; H04L 67/56; H04L 67/562; H04L 47/20; H04L 67/141; H04M 15/66; H04M 15/8038; H04M 15/60
See application file for complete search history.

(56) References Cited

U.S. PATENT DOCUMENTS

| | | | |
|---|---|---|---|
| 2023/0189058 A1* | 6/2023 | Yeh ................... | H04W 28/0865 370/329 |
| 2023/0292179 A1* | 9/2023 | Sahin .................. | H04L 5/0044 370/235 |
| 2023/0300674 A1* | 9/2023 | Kedalagudde ........ | H04W 24/10 370/230.1 |

OTHER PUBLICATIONS

3GPP TS 23.502 V17.0.0 (Mar. 2021) Technical Specification; 3rd Generation Partnership Project; Technical Specification Group Services and System Aspects; Procedures for the 5G System (5GS); Stage 2 (Release 17); 646 pages.
3GPP TS 23.501 V17.0.0 (Mar. 2021); Technical Specification; 3rd Generation Partnership Project; Technical Specification Group Services and System Aspects; System architecture for the 5G System (5GS); Stage 2 (Release 17); 489 pages.
3GPP TS 23.501 V16.0.0 (Mar. 2019) Technical Specification; 3rd Generation Partnership Project; Technical Specification Group Services and System Aspects; System Architecture for the 5G System; Stage 2 (Release 16); 318 pages.
3GPP TR 23.700-93 V2.0.0 (Mar. 2021); Technical Report; 3rd Generation Partnership Project; Technical Specification Group Services and System Aspects; Study on Access Traffic Steering, Switch and Splitting support in the 5G system architecture Phase 2 (Release 17), 101 pages.
International Search Report and Written Opinion of the International Searching Authority dated Jun. 30, 2022, in connection with International Application No. PCT/KR2022/004766, 8 pages.
3GPP TS 29.244 V17.0.0 (Mar. 2021) Technical Specification; 3rd Generation Partnership Project; Technical Specification Group Core Network and Terminals; Interface between the Control Plane and the User Plane Nodes; Stage 3 (Release 17); 327 pages.
3GPP TR 23.700-93 V17.0.0 (Mar. 2021) Technical Report; 3rd Generation Partnership Project; Technical Specification Group Services and System Aspects; Study on access traffic steering, switch and splitting support in the 5G System (5GS) architecture; Phase 2 (Release 17); 102 pages.
3GPP TR 23.793 V16.0.0 (Dec. 2018) Technical Report; 3rd Generation Partnership Project; Technical Specification Group Services and System Aspects; Study on access traffic steering, switch and splitting support in the 5G system architecture (Release 16); 115 pages.
Lenovo et al., "PMF extensions for sending UE-assistance data to UPF", S2-2100799, 3GPP TSG-WG SA2 Meeting #143 e-meeting, Feb. 24-Mar. 9, 2021; Elbonia, 5 pages.
Supplementary European Search Report dated Jun. 28, 2024, in connection with European Patent Application No. 22784879.3, 10 pages.
Ericsson: "KI#1, Sol4412: Solution update for UE assistance", S2-2008449, SA WG2 Meeting #142E, Nov. 2020, 4 pages.

* cited by examiner

METHOD AND APPARATUS FOR PROVIDING TRAFFIC STEERING IN MOBILE COMMUNICATION SYSTEM

CROSS-REFERENCE TO RELATED APPLICATION

This application is based on and claims priority under 35 U.S.C. § 119 to Korean Patent Application No. 10-2021-0044105, filed on Apr. 5, 2021, in the Korean Intellectual Property Office, the disclosure of which is herein incorporated by reference in its entirety.

BACKGROUND

1. Field

The disclosure relates to an apparatus and method for providing a session management in a wireless communication system or a mobile communication system. Particularly, the disclosure relates to a method and apparatus for providing an access traffic steering function (access traffic steering, switching, splitting (ATSSS)) in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "Beyond 4G Network" or a "Post long term evolution (LTE) System." The 5G communication system established by the 3rd generation partnership project (3GPP) is called a new radio (NR) system.

The 5G communication system is considered to be implemented in extremely high frequency (mmWave) bands (e.g., 60 GHz bands) so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed and adopted in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

SUMMARY

In the 5G system, the ATSSS function provides a method of splitting data traffic between a data network (DN) and a user equipment (UE) by using 3GPP access and non-3GPP access at the same time and thereby reduce a transmission load. A split ratio of data traffic may be differently applied to an uplink (UL) and a downlink (DL). The data traffic split ratio may be contained in a session management policy determined by a policy control function (PCF) device and transmitted to a session management function (SMF) device. Then, the SMF may include the data traffic split ratio for the uplink in an ATSSS rule and deliver the data traffic split ratio to the UE. In addition, the SMF may include the data traffic split ratio for the downlink in an N4 rule and deliver the data traffic split ratio to a user plane function (UPF) device. In the 5G system up to now, it has been preferred to distribute the traffic to the UE and the UPF according to the data traffic split ratio generated and delivered by the PCF.

In the 5G system, the PCF may include in the session management policy an indicator indicating whether to allow a ratio different from the data traffic split ratio generated by the PCF to be applied at the discretion of the UE and the UPF. When receiving this indicator, each of the UE and the UPF may determine a traffic split ratio according to its internal state (e.g., a battery level in case of the UE). For example, a split ratio having a value different from that of the data traffic split ratio received from the PCF may be used according to the uplink bandwidth in case of the UE and the downlink bandwidth in case of the UPF. If the data traffic split ratio for the uplink is changed at UE's discretion, there arise a problem that the core network cannot determine whether the changed split ratio is caused by any abnormal operation of the network or the UE's discretion. In addition, there is a problem that a difference may occur between a data usage fee predicted and measured by the user of the UE and a data usage fee predicted and measured by the core network based on the traffic split ratio generated by the PCF.

Accordingly, the disclosure provides a method and apparatus allowing each subject determining a traffic split ratio to provide information on the determined traffic split ratio to an appropriate network function (NF) device of a core network.

In addition, the disclosure provides a method and apparatus for charging an accurate fee for transmitted/received traffic based on a traffic split ratio determined by each device.

In addition, the disclosure provides a method and apparatus capable of more accurately predicting a fee to be charged based on a traffic split ratio determined by each device and transmitted/received traffic.

In addition, the disclosure provides a method and apparatus for adaptively determining a traffic split ratio depending on a situation in a user device and a specific node of a network, and performing appropriate charging based on the determined ratio and transmitted/received traffic.

According to the disclosure, when a UE changes a data traffic split ratio, the UE notifies a UPF of the changed data traffic split ratio and a start point of applying the changed ratio.

According to the disclosure, when the UPF receives the changed data traffic split ratio and the applying start point from the UE, the UPF delivers them to an SMF and counts packets of applying the changed ratio as a separate counter.

According to the disclosure, the SMF determines whether the data traffic split ratio changed by the UE violates other session management policies. If the data traffic split ratio changed by the UE violates any other session management policy, the SMF may request a PCF to create a new session management policy. If other session management policies are not violated, the SMF may make the PCF to update an existing session management policy. The SMF notifies the new session management policy or an update result of the existing session management policy to the UPF and the UE.

According to the disclosure, the UPF provides the SMF with a packet counting value of an interval in which the data traffic split ratio is changed. The SMF updates a traffic monitoring record by applying the packet counting value received from the UPF and notifies the traffic monitoring record to the PCF.

According to the disclosure, the UE and the UPF store an ATSSS rule and an N4 rule in which the changed data traffic split ratio is reflected.

According to an embodiment of the disclosure, a method for providing a multiple access protocol data unit (MA PDU) service to a user equipment (UE) by a user plane function (UPF) device in a mobile communication system may include receiving an N4 rule including a traffic transmission method for downlinks (DLs) to the UE from a session management function (SMF) device, wherein the DLs include a DL of 3GPP access and a DL of non-3GPP access; receiving a split ratio change report for uplink (UL) traffic to the 3GPP access and UL traffic to the non-3GPP access from the UE; generating a first traffic counter based on the received split ratio change report; and transmitting the split ratio change report to the SMF device.

In addition, according to an embodiment of the disclosure, a user plane function (UPF) device for providing a multiple access protocol data unit (MA PDU) service to a user equipment (UE) in a mobile communication system may include a network interface configured to communicate with the UE and other network function (NF); a memory; and at least one processor. The at least one processor may be configured to control the network interface to receive an N4 rule including a traffic transmission method for downlinks (DLs) to the UE from a session management function (SMF) device, wherein the DLs include a DL of 3GPP access and a DL of non-3GPP access, to control the network interface to receive a split ratio change report for uplink (UL) traffic to the 3GPP access and UL traffic to the non-3GPP access from the UE, to generate a first traffic counter based on the received split ratio change report, and to control the network interface to transmit the split ratio change report to the SMF device.

According to the apparatus and method in various embodiments of the disclosure, it is possible to dynamically determine the data traffic split ratio of the MA PDU session based on the internal state of the UE, the network status for each access, subscriber information, and the session management policy. Therefore, it is possible to efficiently provide services in a mobile communication system.

The effects obtainable from the disclosure are not limited to the above-mentioned effects, and other effects not mentioned are clearly understood from the following description by a person skilled in the art to which the disclosure belongs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. In the drawings, the same or corresponding elements are denoted by the same reference numerals. In addition, the drawings are provided to help the understanding of the disclosure, and the disclosure is not limited by the form or arrangement illustrated in the drawings. Also, detailed descriptions of well-known functions and components that may obscure the subject matter of the disclosure will be omitted. In the following description, only parts necessary for understanding the operation according to various embodiments of the disclosure will be described, and the descriptions of other parts will be omitted so as not to obscure the subject matter of the disclosure. Although the disclosure describes various embodiments using terms used in some communication standards (e.g., the 3rd Generation Partnership Project (3GPP)), this is only an example for description. Various embodiments of the disclosure may be easily modified and applied in other communication systems.

Figure 1:
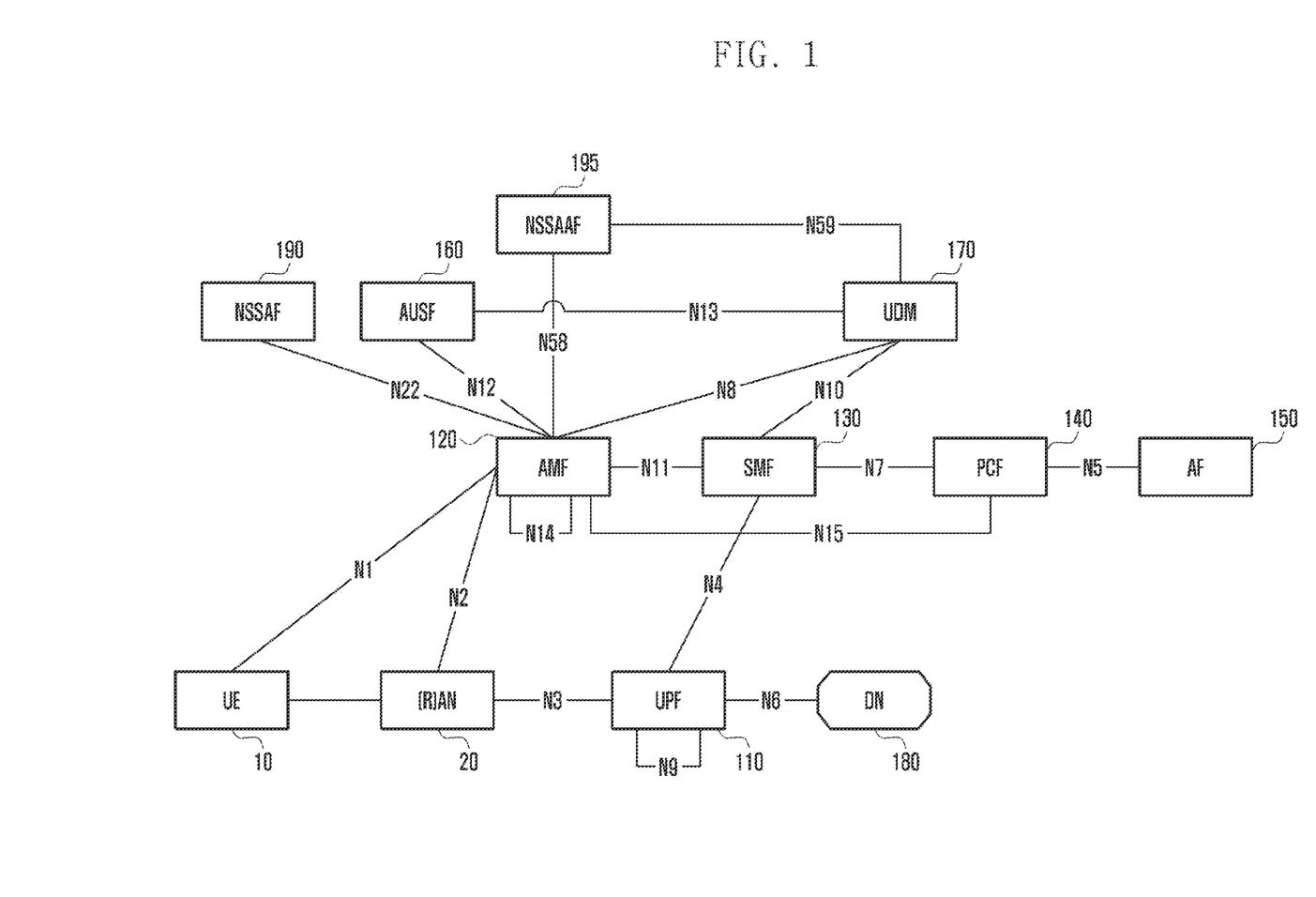
FIG. 1 is a diagram illustrating a 5G system architecture according to an embodiment of the present disclosure.

FIG. 1 is a diagram illustrating a 5G system architecture according to an embodiment of the present disclosure.

With reference to FIG. 1, the 5G system architecture may include various components (i.e., network functions (NFs)). Exemplarily shown in FIG. 1 are some of them, such as an authentication server function (AUSF) device 160, a (core) access and mobility management function (AMF) device 120, a session management function (SMF) device 130, a policy control function (PCF) device 140, an application function (AF) device 150, a unified data management (UDM) device 170, a data network (DN) 180, a user plane function (UPF) device 110, a (radio) access network ((R) AN) 20, and a terminal, that is, a user equipment (UE) 10. In addition, FIG. 1 exemplarily shows a network slice selection function (NSSF) device 190 and a network slice specific authentication and authorization function (NS-SAAF) device 195.

Each of the devices illustrated in FIG. 1 may be implemented as one server or apparatus or may be implemented as a network slice instance. In the latter case, two or more identical or different network slice instances may be implemented in one server or apparatus, or one network slice instance may be implemented in two or more servers or apparatuses.

The above-mentioned respective NFs may support the following functions.

The AUSF 160 may process and store data for authentication of the UE 10.

The AMF 120 may provide a function for access and mobility management in a unit of UE, and one UE may be basically connected to one AMF. Specifically, the AMF 120 may support functions such as signaling between CN nodes for mobility between 3GPP access networks, termination of a CP interface (i.e., N2 interface) of the radio access network (RAN) 20, termination of NAS signaling (N1), NAS signaling security (NAS ciphering and integrity protection), AS security control, registration management (registration area management), connection management, idle mode UE accessibility (reachability) (including control and execution of paging retransmission), mobility management control (subscription and policy), support of intra-system mobility and inter-system mobility, support of network slicing, SMF selection, lawful intercept (for an AMF event and an interface to LI system), delivery of session management (SM) messages between the UE 10 and the SMF 130, a transparent proxy for SM message routing, access authentication, access authorization including roaming permission check, delivery of SMS messages between the UE 10 and a short message service function (SMSF) device (not shown in FIG. 1), security anchor function (SAF), and/or security context management (SCM). Some function(s) or all functions of the AMF 120 may be supported in a single AMF instance operating as one AMF.

The DN 180 may mean, for example, an operator service, Internet access, or a third party service. The DN 180 may transmit a downlink protocol data unit (PDU) to the UPF 110 or may receive a PDU transmitted by the UE 10 through the UPF 110.

The PCF 140 may receive information on packet flow from an application server (not shown in FIG. 1) within the DN 180 and/or the AF 150 and provide a function of determining policies such as mobility management and session management. Specifically, the PCF 140 may support functions such as supporting a unified policy framework for controlling network operations, providing a policy rule so that control plane function(s) (e.g., AMF, SMF, etc.) can enforce the policy rule, and implementing a front end to access relevant subscription information for policy decision in a user data repository (UDR).

The SMF 130 may provide a session management function, and when one UE 10 has a plurality of sessions, it may be managed by different SMFs for respective sessions. Specifically, the SMF 130 may support functions such as session management (e.g., session establishment, modification, and cancellation, including maintaining a tunnel between the UPF 110 and AN 20 nodes), UE IP address assignment and management (optionally including authentication), selection and control of the UPF 110, configuration of traffic steering to route traffic from the UPF 110 to an appropriate destination, termination of an interface towards policy control functions, enforcement of a control part of quality of service (QoS) and policy, lawful intercept (for an SM event and an interface to LI system), termination of an SM part of a NAS message, downlink data notification, an initiator of AN-specific SM information (delivered to AN through N2 via AMF), determination of SSC mode of a session, and a roaming function. Some function(s) or all functions of the SMF 130 may be supported in a single SMF instance operating as one SMF.

The UDM 170 may store user's subscription data, policy data, and the like. The UDM 170 may include two parts, that is, an application front end (FE) (not shown) and a user data repository (UDR) (not shown).

The FE may include a UDM-FE in charge of location management, subscription management, credential processing, and the like, and a PCF-FE in charge of policy control. The UDM 170 may store data required for functions provided by the UDM-FE and a policy profile required by the PCF 140. The data stored in the UDM may include user subscription data and policy data including subscription identifier, security credential, access and mobility related subscription data, and session related subscription data. The UDM-FE may access subscription information stored in the UDM 170 and support functions such as authentication credential processing, user identification handling, access authentication, registration/mobility management, subscription management, and SMS management.

The UPF 110 may transmit the downlink PDU, received from the DN 180, to the UE 10 via the (R)AN 20 and transmit the uplink PDU, received from the UE 10 via the (R)AN 20, to the DN 180. Specifically, the UPF 110 may support functions such as an anchor point for intra/inter RAT mobility, an external PDU session point of interconnection to a data network, packet routing and forwarding, a user plane part of policy rule enforcement and packet inspection, lawful intercept, traffic usage reporting, uplink classifier to support routing of traffic flow to a data network, a branching point to support a multi-homed PDU session, QoS handling (e.g., packet filtering, gating, uplink/downlink rate enforcement) for a user plane, uplink traffic verification (service data flow (SDF) mapping between the SDF and QoS flow), uplink and downlink transport level packet marking, downlink packet buffering, and downlink data notification triggering. Some function(s) or all functions of the UPF 110 may be supported in a single UFP instance operating as one UPF.

The AF 150 may interoperate with the 3GPP core network to provide services (e.g., support functions such as application impact on traffic routing, access to network capability exposure, and interaction with a policy framework for policy control).

The (R)AN 20 may refer to a new radio access network that supports all of an evolved E-UTRA, which is an evolved version of 4G radio access technology, and new radio access technology (new radio, NR) (e.g., gNB).

The gNB may support functions such as functions for radio resource management (i.e., radio bearer control, radio admission control, connection mobility control, and dynamic allocation (i.e., scheduling) of resources to the UE in uplink/downlink), Internet protocol (IP) header compression, encryption and integrity protection of user data stream, selection of the AMF 120 upon attachment of the UE 10 when routing to the AMF 120 is not determined from information provided to the UE 10, user plane data routing to the UPF(s) 110, control plane information routing to the AMF 120, connection setup and cancellation, scheduling and transmission of paging messages (occurring from the AMF), scheduling and transmission of system broadcast information (occurring from the AMF or an operating and maintenance (O&M)), measurement for mobility and scheduling and measurement report configuration, transport level packet marking in uplink, session management, network slicing support, QoS flow management and mapping to a data radio bearer, support of UE in inactive mode, a NAS message distribution function, a NAS node selection function, radio access network sharing, dual connectivity, and tight interworking between NR and E-UTRA.

The UE 10 may refer to a user device. The UE 10 may be referred to as a terminal, mobile equipment (ME), mobile station (MS), or the like. In addition, the UE may be a portable device such as a notebook, a mobile phone, a personal digital assistant (PDA), a smart phone, or a multimedia device, or may be a non-portable device such as a personal computer (PC) or in-vehicle device. Hereinafter, it will be referred to as a user equipment (UE) or a terminal.

A network exposure function (NEF) device and an NF repository function (NRF) device are not shown in FIG. 1. However, all of the NFs shown in FIG. 1 may interoperate with the NEF and the NRF as needed.

The NRF (not shown in FIG. 1) may support a service discovery function. When a second NF discovery request is received from a first NF instance, information on a second NF instance discovered through a second NF discovery operation may be provided to the first NF instance. In addition, available NF instances and services supported by them may be maintained.

Meanwhile, for convenience of description, FIG. 1 exemplarily shows a reference model for a case in which the UE accesses one DN by using one PDU session, but the disclosure is not limited to FIG. 1.

The UE 10 may simultaneously access two (i.e., local and central) data networks by using multiple PDU sessions. In this case, two SMFs may be selected for different PDU sessions. However, each SMF may have the ability to control both the local UPF and the central UPF within the PDU session.

In addition, the UE 10 may simultaneously access two (i.e., local and central) data networks provided within a single PDU session.

In the 3GPP system, a conceptual link connecting NFs in the 5G system is defined as a reference point. The following are reference points included in the 5G system architecture shown in FIG. 1:

N1: A reference point between UE and AMF;
N2: A reference point between (R)AN and AMF;
N3: A reference point between (R)AN and UPF;
N4: A reference point between SMF and UPF;
N5: A reference point between PCF and AF;
N6: A reference point between UPF and data network;
N7: A reference point between SMF and PCF;
N8: A reference point between UDM and AMF;
N9: A reference point between two core UPFs;

N10: A reference point between UDM and SMF;
N11: A reference point between AMF and SMF;
N12: A reference point between AMF and AUSF;
N13: A reference point between UDM and authentication server function (AUSF);
N14: A reference point between two AMFs; and
N15: In case of a non-roaming scenario, a reference point between PCF and AMF, in case of a roaming scenario, a reference point between PCF and AMF in a visited network.

In the following description, a terminal may refer to the UE 10, and the terms UE or terminal may be used interchangeably. In this case, it should be understood as the UE 10 unless the UE is additionally defined.

The UE establishes a session by accessing the data network 180 (e.g., a network providing Internet service) through the 5G system, and each data network can be distinguished using an identifier called a data network name (DNN). The DNN may be used to determine an NF related to a user plane, an interface between NFs, an operator policy, and the like when the UE connects a session with a network system. The DNN may be used, for example, to select the SMF 130 and the UPF(s) 110 for a PDU session and used to select interface(s) (e.g., N6 interface) between the data network and the UPF for a PDU session. Also, the DNN may be used to determine a mobile communication operator's policy to be applied to a PDU session.

The ATSSS function is a function of transferring data traffic through one or more accesses by utilizing all of the 3GPP access and/or non-3GPP access described above between the UE and the 5G core network. In a representative example, when the 5G core network determines that a user-plane resource between the UE and the data network (DN) 180 is insufficient or that a load has occurred in the resource management capacity of the network, data traffic is distributed and transmitted by activating both 5G access and Wi-Fi access, rather than transmitted only through either 5G access or Wi-Fi access.

Figure 2:
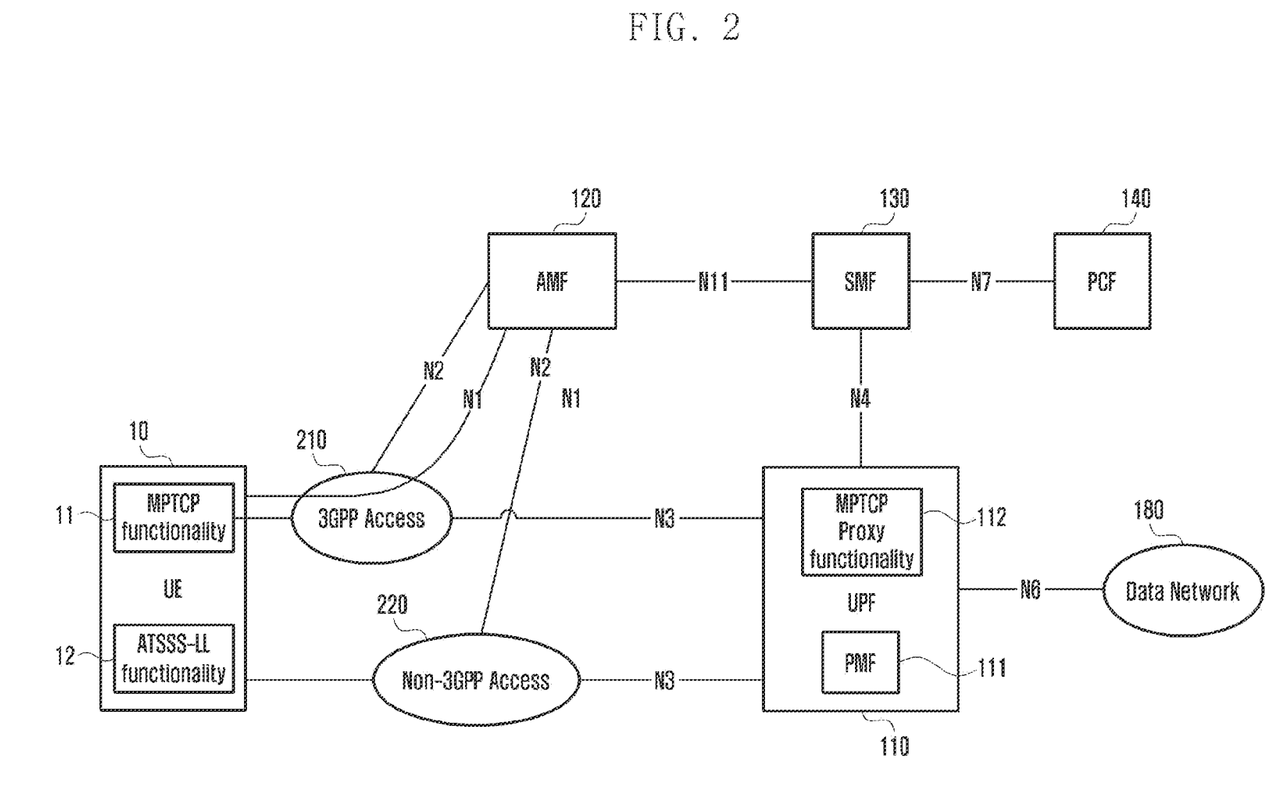
FIG. 2 is a diagram illustrating a 5G system architecture for supporting an ATSSS function according to an embodiment of the present disclosure.

FIG. 2 is a diagram illustrating an example of an access traffic steering, switching, splitting (ATSSS) support architecture according to an embodiment of the present disclosure for a 3GPP 5G system.

With reference to FIG. 2, the UE 10 may access a mobile communication network, for example, a 3GPP access 210, and a network other than the mobile communication network, for example, a non-3GPP access 220. The ATSSS function includes a steering functionality and a steering mode. The steering functionality determines a transport protocol between a UPF of a transmitting device and a UPF of a receiving device. The steering functionality is determined depending on which transport layer determines traffic steering, switching, and splitting. When a multi path transmission control protocol (MPTCP) (IETF RFC 8684) located in a layer higher than the IP layer is used, the steering functionality corresponds to "MPTCP functionality," and when determined in a layer lower than the IP layer, the steering functionality corresponds to "ATSSS-lower layer (ATSSS-LL) functionality." The UE and network supporting the MPTCP functionality may communicate with an MPTCP proxy configured separately in the UPF. The MPTCP functionality can control only TCP traffic supporting the MPTCP protocol. If the ATSSS-LL functionality is supported, a separate proxy component is not included in the UPF, and all types of TCP traffic can be controlled. The steering mode defines a method of steering, switching, and splitting data traffic.

In addition, the UPF 110, the SMF 130, and the PCF 140 according to the disclosure may perform a separate control operation for the access of the UE 10. This control operation will be described later with reference to the drawings.

As shown, the UPF 110 according to the disclosure may include therein an MPTCP proxy functionality 112 for allowing access from the 3GPP access point 210 and may also include a performance measurement function (PMF) 111 for allowing access from the non-3GPP access point 220. The MPTCP proxy functionality 112 and the PMF 111 shown in FIG. 2 may be implemented only in software in the UPF, implemented in a complex form of hardware and software, or implemented only in hardware performing the corresponding function. In general cases, the MPTCP proxy functionality 112 and the PMF 111 may be implemented in a complex form of hardware and software.

The PMF 111 is a function of measuring a network environment between the UE 10 and the UPF 110, and is capable of measuring a round trip time (RTT) required for uplink and downlink, and measuring whether the 3GPP access and the non-3GPP access are currently activated. Based on information provided by the PMF 111, it is possible to determine the steering functionality and steering mode supportable by the core network, and they have an overall effect on parameter determination for N3 and N4 connections.

If the ATSSS function described in FIG. 2 is utilized, traffic transmission is possible through multiple paths between the UE 10 and the protocol data unit or packet data unit (PDU) session anchor user plane function (UPF) 110 as in FIG. 1.

Figure 3:
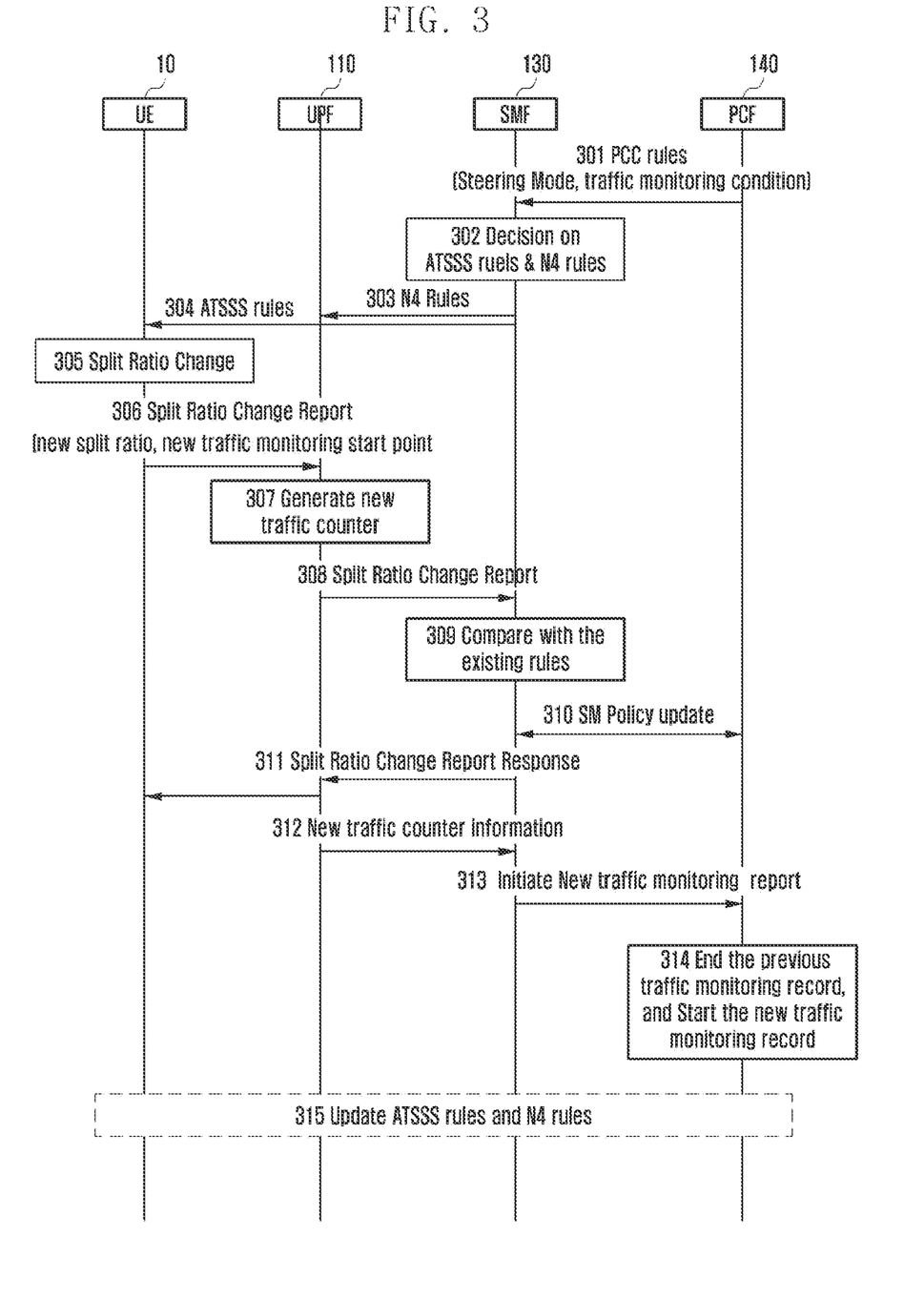
FIG. 3 is a diagram illustrating a data traffic split ratio change by a UE and a related procedure according to an embodiment of the present disclosure.

FIG. 3 illustrates a signal flow diagram for providing information to a core network when a data traffic split ratio is changed in a UE according to an embodiment of the present disclosure.

At step 301, the PCF 140 may transmit a session management policy to the SMF 130. The session management policy may include a steering mode and a traffic monitoring condition. The steering mode may be configured as a load-balancing mode. When the steering mode is configured as the load-balancing mode, the session management policy may include a split ratio value of 3GPP access and non-3GPP access. In addition, the session management policy may include an indicator as to whether the UE 10 and/or the UPF 110 can configure the split ratio. This indicator may include the following two types.

In one example of Type 1, the split ratio may be autonomously configured by the UE 10 or the UPF 110. Upon receiving the type 1 indicator, the UE 10 may autonomously configure a split ratio for uplink. Upon receiving the type 1 indicator, the UPF 110 may configure a split ratio for downlink.

In another example of Type 2, the split ratio of the uplink may be configured by the UE 10. Upon receiving the type 2 indicator, the UE 10 may provide the uplink split ratio determined by the UE 10 to the UPF 110. In addition, the UE 10 may request the UPF 110 to change the downlink split ratio with reference to the uplink split ratio determined by the UE 10. Upon receiving the downlink split ratio change request from the UE 10, the UPF 110 receiving the type 2 indicator may change the downlink split ratio with reference to the split ratio determined by the UE 10.

The traffic monitoring condition may include a condition for monitoring a resource used in the user plane in each of the 3GPP access and the non-3GPP access. The monitoring condition may include a traffic volume, a resource usage time, and a monitoring start time.

At step 302, the SMF 130 may determine a data traffic transmission method for the uplink and a data traffic transmission method for the downlink by referring to the session management policy received from the PCF 140 at the step 301 including the steering mode, the split ratio for each access type, the indicator as to whether the UE 10 and/or the UPF 110 can configure the split ratio, the user's subscriber information, the location of the UE 10, and the connection state of the UE 10 for each access type. In addition, the SMF 130 may determine whether to transmit the indicator as to whether the UE 10 and/or the UPF 110 can configure the split ratio to each of the UE 10 and the UPF 110. When determining to transmit the indicator as to whether the UE 10 and/or the UPF 110 can configure the split ratio, the SMF 130 may include the indicator in the uplink or downlink data traffic transmission method.

In addition, the SMF 130 may monitor a resource used in the user plane for each access type with reference to the traffic monitoring condition included in the session management policy received from the PCF 140 at the step 301 and prepare to report the monitoring result to the PCF 140. For example, if the monitoring condition is "traffic capacity=1 KB," the SMF 130 may notify the PCF 140 whenever the resource used in the user plane for each access type becomes 1 KB. The SMF 130 may provide the UPF 110 with a condition for measuring user plane resource usage for each access type in order to monitor the resource used in the user plane. The user plane resource usage measurement condition for each access type may be included in the N4 rule.

At step 303, the SMF 130 may include the downlink data traffic transmission method determined at the step 302 in the N4 rule and transmit the downlink data traffic transmission method to the UPF 110. Upon receiving the N4 rule, the UPF 110 may prepare to transmit data traffic received from the DN 180 to the UE 10 according to the downlink traffic transmission method provided from the SMF 130.

At step 304, the SMF 130 may include the uplink data traffic transmission method determined at the step 302 in the ATSSS rule and transmit the uplink data traffic transmission method to the UE 10. The SMF 130 may deliver the ATSSS rule to the UE 10 through the AMF (120 in FIG. 1). Upon receiving the ATSSS rule, the UE 10 may prepare to transmit data traffic to be transmitted to the DN 180 to the UPF 110 according to the uplink traffic transmission method provided from the SMF 120.

The order of the steps 303 and 304 may be reversed. Alternatively, the steps 303 and 304 may be performed simultaneously.

At step 305, the UE 10 may determine a change in the uplink data traffic split ratio based on information received at the step 304. The UE 10 may determine the uplink data traffic split ratio change based on the following information (a) to (f):
(a) ATSSS rule received at the step 304;
(b) UE's battery status;
(c) User's usage pattern of device, service, or application;
(d) Operator policy;
(e) UE location;
(f) Data link status for each access type; and/or
(g) UE connection state for each access type.

At step 306, the UE 10 that determines the change in the uplink data traffic split ratio based on one or more of the above information may notify the uplink data traffic split ratio change to the UPF 110. This message transmitted by the UE 10 to the UPF 110 may include the uplink data traffic split ratio (new split ratio) determined by the UE 10 and a time point of applying the changed ratio (new traffic monitoring start point). This information on the time point of applying the changed rate may include information (e.g., packet sequence number) for identifying a packet, or information (e.g., UTC timestamp) for identifying a time indicating when the changed rate is applied. In addition, when the ATSSS rule received by the UE 10 at the step 304 includes the indicator of type 2 described at the step 301, the UE 10 may request the UPF 110 to change the downlink data traffic split ratio by referring to the uplink data traffic split ratio determined by the UE.

At step 307, the UPF 110 may generate a new traffic counter for calculating the amount of user plane resources of the uplink by using the time point to apply the changed ratio provided from the UE 10 at the step 306. As described at the step 302, the traffic counting method may follow the user plane resource usage measurement condition for each access type provided to the UPF 110 by the SMF 130.

In addition, when the UPF 110 receives the type 1 indicator or the type 2 indicator from the PCF 140 through the SMF 130 or receives a request to change the split ratio for the downlink from the UE 10, the UPF 110 may configure the split ratio for the downlink based on the obtained information. When the UPF 110 changes the split ratio for the downlink, the UPF 110 may generate a new traffic counter.

At step 308, the UPF 110 may deliver the new split ratio provided from the UE 10 at the step 306 to the SMF 130. In addition, when the split ratio for the downlink is changed at the step 307, the UPF 110 may deliver a new split ratio for the downlink to the SMF 130.

At step 309, the SMF 130 may determine (or identify) whether the new split ratio for the uplink and/or downlink provided by the UPF 110 at the step 308 violates the session management policy for the current MA PDU session or violates the subscriber information or the UE management policy.

At step 310, the SMF 130 and the PCF 140 may update the session management policy based on the determination result of the step 309. If it is determined at the step 309 that there is a violating policy, the SMF 130 may request the PCF 140 to provide a session management policy including a split ratio for uplink and/or downlink. If it is determined at the step 309 that there is no violating policy, the SMF 130 may notify the PCF 140 of the changed split ratio for uplink and/or downlink and request the PCF 140 to update the current session management policy for the MA PDU session. Upon the request of the SMF 130, the PCF 140 may determine and provide a new session management policy or update the session management policy possessed by the PCF 140. Even if the SMF 130 requests the update of the session management policy possessed by the PCF 140, the PCF 140 may newly determine a session management policy by determining whether there is a violation of policies (e.g., non-session management related policy) other than the policy related to the current MA PDU session.

When determining a new session management policy, the PCF 130 may provide a new traffic monitoring condition to the SMF 130. In addition, the PCF 140 may provide, together with priorities, both the session management policy to which the traffic split ratio changed by the UE 10 or the UPF 110 is applied, and the existing session management policy provided by the PCF 140 at the step 301. When determining a new session management policy, the PCF 140 may provide the new session management policy as well together with priorities. Information on session management policies including priorities may be included in a UE route selection policy (URSP).

At step 311, the SMF 130 may transmit, to the UPF 110 and the UE 10, the result of notifying a change in the split ratio of the uplink and/or downlink to the PCF 140 and updating the session management policy at the step 310. When receiving a new session management policy or a new traffic monitoring condition from the PCF 140, the SMF 130 may transmit the new session management policy or the new traffic monitoring condition to the UPF 110.

At step 312, the UPF 110 may determine, based on information received at the step 311, whether to deliver the resource usage of the user plane counted by the new traffic counter generated at the step 307 to the SMF 130. A case of delivering the resource usage counted by the traffic counter to the SMF 130 will be described.

(1) In case that the UPF 110 receives a new session management policy or a new traffic monitoring condition at the step 311, the UPF 110 may deliver the counting result with the new traffic counter generated at the step 307 to the SMF 130 and newly start the measurement of a user plane resource usage by applying the new session management policy or new traffic monitoring condition received at the step 311.

(2) In case that the UPF 110 receives at the step 311 a notification that the PCF 140 has performed the update by reflecting the split ratio changed by the UE 10 and/or the UPF 110 in the session management policy for the current MA PDU session, the UPF 110 may continue counting using the new traffic counter generated at the step 307.

At step 313, the SMF 130 may report the result of the measurement of user plane resource usage received from the UPF 110 at the step 312 to the PCF 140. In case of (1) at the step 312, the SMF 130 may notify the PCF 140 of the counting result using the new traffic counter generated at the step 307. Through this, the PCF 140 may acquire information on the amount of traffic transmitted before counting of the new traffic counter. In addition, the SMF 130 may notify the PCF 140 of the result of counting by the new session management policy or new traffic monitoring condition received at the step 310 when the policy and condition received at the step 310 is satisfied. In case of (2) at the step 312, the SMF 130 may notify the PCF 140 of the counting result using the new traffic counter generated at the step 307 when the session management policy and traffic monitoring condition received at the step 301 are satisfied.

At step 314, the PCF 140 may end a procedure based on a traffic monitoring record prior to the step 310 and start recording of traffic monitoring received from the SMF 130 after the step 310 and a related procedure.

At step 315, the UE 10 and the UPF 110 may update the ATSSS rule and the N4 rule, based on information received at the step 311.

At the steps 306 and 311, the UE 10 and the UPF 110 may use a PMF protocol in exchanging a traffic transmission rate using 3GPP access and non-3GPP access and information for changing or applying the PMF protocol. When using the PMF protocol, the UE 10 may include information in a PMF message and transmit the information to the PMF 111 of the UPF 110, and the UPF 110 may include information in the PMF message and transmit the information to the UE 10 at the PMF 111.

Figure 4:
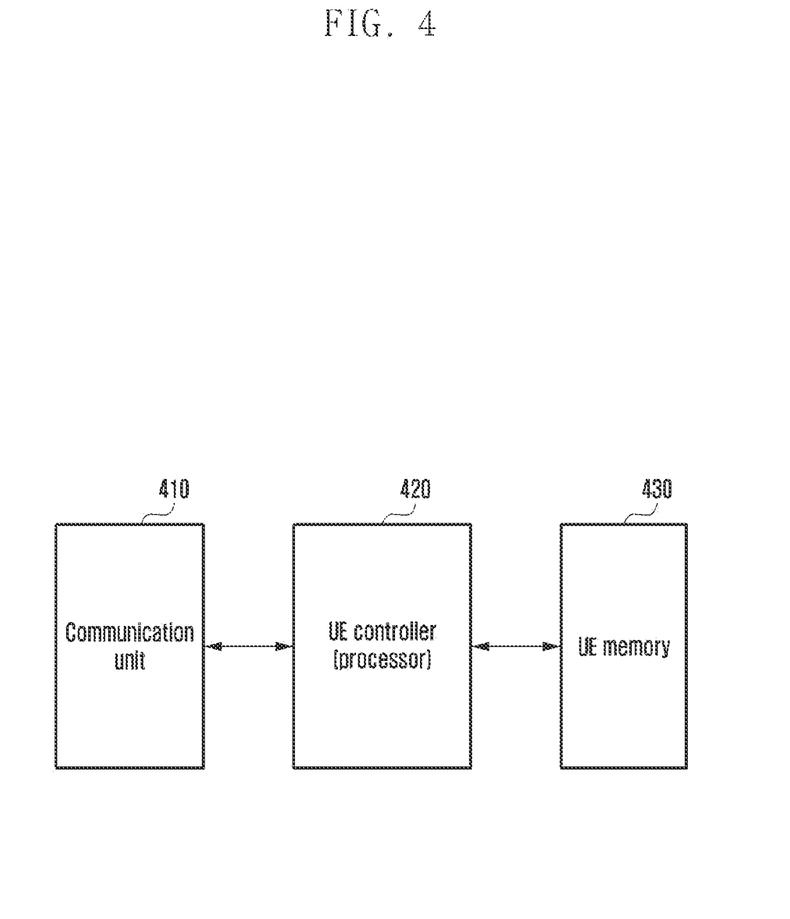
FIG. 4 illustrates a functional block diagram of a user device according to an embodiment of the present disclosure.

FIG. 4 illustrates a functional block diagram of a user device according to an embodiment of the present disclosure.

With reference to FIG. 4, the UE 10 may include a communication unit 410, a UE controller 420, and a UE memory 430. The communication unit 410 may include a wireless communication module, a modem, and/or a communication processor which can communicate with a 3GPP access network such as a cellular system such as LTE, LTE-A, or 5G network. Also, the communication unit 410 may include a wireless communication module, a modem, and/or a communication processor for non-3GPP access. The wireless communication module, the modem, and/or the communication processor may be implemented as separate components to operate in response to each of the 3GPP access network and the non-3GPP access network, and they may be implemented in the form of a single chip. In another example, among internal components of the wireless communication unit for communicating with the 3GPP access network and the non-3GPP access network, only some of the above-described components may be implemented as a single chip, and the rest may be implemented separately.

The UE controller 420 may perform overall control of the UE 10 and perform control to connect and release a call at a user's request and to provide a user customized service. In addition, the UE controller 420 may receive the ATSSS rule as described above according to the disclosure and, based on the ATSSS rule, control the operation described above with reference to FIG. 3.

The UE memory 430 may include a region for storing various kinds of control information necessary for the UE 10 and a region for storing user data.

In addition, the UE 10 may further include a display device such as a display, LCD, and/or LED for interfacing with the user, and may include various interfaces for detecting a user input. Besides, the UE 10 may be implemented to have more components as needed. In FIG. 4, only essential components are exemplified in describing the disclosure.

Figure 5:
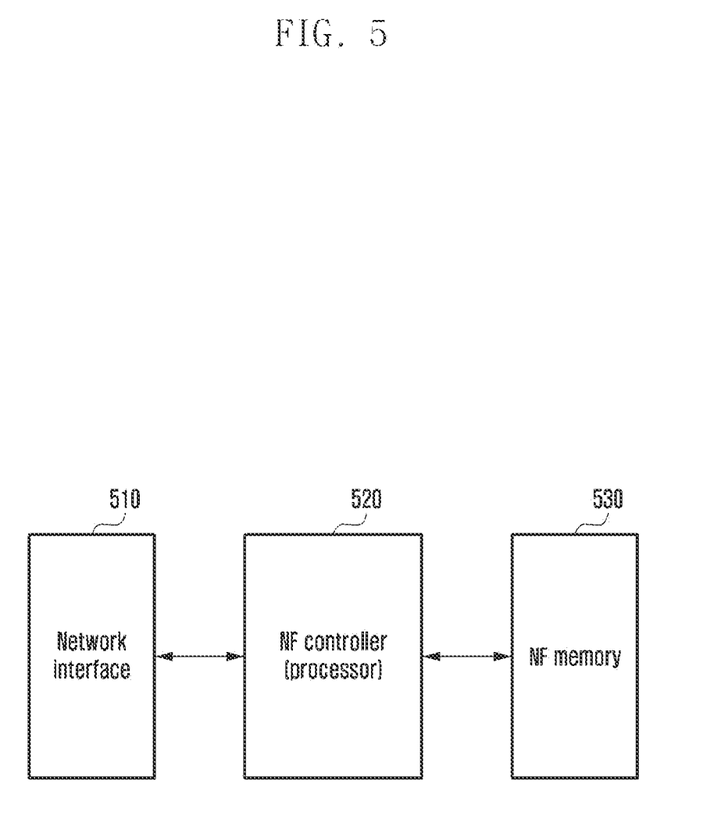
FIG. 5 illustrates a functional block diagram of a network function device according to the present disclosure.

FIG. 5 illustrates a block diagram of a network function (NF) device applicable according to an embodiment of the present disclosure.

With reference to FIG. 5, the NF device may include a network interface 510, an NF controller 520, and an NF memory 530.

The network interface 510 may provide an interface for communication with other NFs. For example, when the NF is the UPF 110, an interface for communicating with the SMF 130 may be provided. Also, when the NF is the UPF 110, the NF may include an interface with the RAN 20. In another example, when the NF is the SMF 130, an interface for transmitting/receiving various control messages/signals and counting information for traffic described in FIG. 3 to/from the UPF 110 and/or the PCF 140 may be provided. Also, when the NF is the PCF 140, an interface for communication with the SMF 130 may be provided. In addition, interfaces for the NF to communicate with other NFs illustrated in FIGS. 1 and 2 may be provided.

The NF controller 520 may control the operation of the corresponding NF. For example, when the NF is the PCF 140, the NF controller 520 may perform control according to the operation of the PCF 140 described above in FIG. 3. When the NF is the SMF 130, the NF controller 520 may perform control according to the operation of the SMF 130 described above in FIG. 3. When the NF is the UPF 110, the NF controller 520 may perform control according to the operation of the UPF 110 described above in FIG. 3.

The NF memory 530 may store information for control of the NF, information generated during control, and information necessary according to the disclosure. For example, information necessary for each NF described in FIG. 3 may be stored, such as the ATSSS rule, the steering mode and traffic monitoring condition, or information on the amount of counted traffic.

Meanwhile, embodiments of the disclosure and the accompanying drawings are only examples presented in order to easily describe the disclosure and facilitate comprehension of the disclosure, but are not intended to limit the scope of the disclosure. Therefore, the scope of the disclosure should be construed as including all changes or modifications derived from the technical contents of the disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user plane function (UPF) for providing a multiple access protocol data unit (MA PDU) service to a user equipment (UE) in a mobile communication system, the method comprising:
receiving, from a session management function (SMF), an N4 rule including a traffic transmission scheme for downlinks (DLs) to the UE, wherein the DLs include a DL of $3^{rd}$ generation partnership project (3GPP) access and a DL of non-3GPP access;
in response to a change of an access traffic steering, switching, splitting (ATSSS) rule determined by the UE, receiving, from the UE, a split ratio change report for an updated split ratio for uplink (UL) traffic to the 3GPP access and UL traffic to the non-3GPP access determined by the UE, wherein the ATSSS is related to the N4 rule;
generating an updated traffic counter for counting an amount of UL traffic according to the received split ratio change report; and
transmitting, to the SMF, the split ratio change report.

2. The method of claim 1, wherein the split ratio change report includes at least one of information on a start point at which a changed ratio of the UL traffic to the 3GPP access or the UL traffic to non-3GPP access is applied.

3. The method of claim 2, wherein the information on the start point includes at least one of a packet sequence number for identifying a packet or a timestamp for identifying a time point to apply the changed ratio.

4. The method of claim 1, wherein the N4 rule includes an indicator as to whether the UPF is capable of autonomously changing a data traffic split ratio to the DL, and a user plane usage measurement condition for each access type.

5. The method of claim 4, further comprising:
identifying the indicator in the N4 rule when a change request of the DL is included in the received split ratio change report; and
when the indicator allows the UPF to autonomously change the data traffic split ratio to the DL, determining the data traffic split ratio to DL traffic for the 3GPP access and DL traffic for the non-3GPP access, based on a split ratio of UL traffic for the 3GPP access and UL traffic for the non-3GPP access included in the split ratio change report.

6. The method of claim 1, further comprising:
counting a resource usage for a user plane for the UE by using the updated traffic counter.

7. The method of claim 6, further comprising:
receiving, from the SMF, a new N4 rule or a new traffic monitoring condition;
delivering, to the SMF, the counted resource usage for the user plane; and
recounting resource usage for the user plane based on the new N4 rule or the new traffic monitoring condition.

8. The method of claim 6, further comprising:
receiving, from the SMF, a notification that the split ratio change report is reflected; and
maintaining the updated traffic counter based on the received notification.

9. A user plane function (UPF) for providing a multiple access protocol data unit (MA PDU) service to a user equipment (UE) in a mobile communication system, the UPF comprising:
a network interface configured to communicate with the UE and other network functions (NF s);
memory; and
at least one processor operably coupled with the network interface and the memory, the at least one processor configured to:
control the network interface to receive, from a session management function (SMF), an N4 rule including a traffic transmission scheme for downlinks (DLs) to the UE, wherein the DLs include a DL of $3^{rd}$ generation partnership project (3GPP) access and a DL of non-3GPP access,
in response to a change of an access traffic steering, switching, splitting (ATSSS) rule determined by the UE, control the network interface to receive, from the UE, a split ratio change report for an updated split ratio for uplink (UL) traffic to the 3GPP access and UL traffic to the non-3GPP access determined by the UE, wherein the ATSSS is related to the N4 rule,
generate an updated traffic counter for counting an amount of UL traffic according to the received split ratio change report, and
control the network interface to transmit, to the SMF, the split ratio change report.

10. The UPF of claim 9, wherein the split ratio change report includes at least one of information on a start point at which a changed ratio of the UL traffic to the 3GPP access or the UL traffic to non-3GPP access is applied.

11. The UPF of claim 10, wherein the information on the start point includes at least one of a packet sequence number for identifying a packet or a timestamp for identifying a time point to apply the changed ratio.

12. The UPF of claim 9, wherein the N4 rule includes an indicator as to whether the UPF is capable of autonomously changing a data traffic split ratio to the DL, and a user plane usage measurement condition for each access type.

13. The UPF of claim 12, wherein the at least one processor is further configured to:
identify the indicator in the N4 rule when a change request of the DL is included in the received split ratio change report, and
when the indicator allows the UPF to autonomously change the data traffic split ratio to the DL, determine the data traffic split ratio to DL traffic for the 3GPP access and DL traffic for the non-3GPP access, based on a split ratio of UL traffic for the 3GPP access and UL traffic for the non-3GPP access included in the split ratio change report.

14. The UPF of claim 9, wherein the at least one processor is further configured to:
count a resource usage for a user plane for the UE by using the updated traffic counter.

15. The UPF of claim 14, wherein the at least one processor is further configured to control to:
receive, from the SMF, a new N4 rule or a new traffic monitoring condition through the network interface,
deliver, to the SMF, the counted resource usage for the user plane, and recount resource usage for the user plane, based on the new N4 rule or the new traffic monitoring condition.

16. The UPF of claim 14, wherein the at least one processor is further configured to:
control the network interface to receive, from the SMF, a notification that the split ratio change report is reflected, and
maintain the updated traffic counter based on the received notification.

* * * * *

UNITED STATES PATENT AND TRADEMARK OFFICE
CERTIFICATE OF CORRECTION

PATENT NO. : 12,075,283 B2
APPLICATION NO. : 17/657917
DATED : August 27, 2024
INVENTOR(S) : Kim et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 122 days.

Signed and Sealed this
Twelfth Day of August, 2025

Coke Morgan Stewart
*Acting Director of the United States Patent and Trademark Office*